A. D. HORNE.
THERMOSTATIC CONTROL APPARATUS.
APPLICATION FILED MAY 6, 1922.
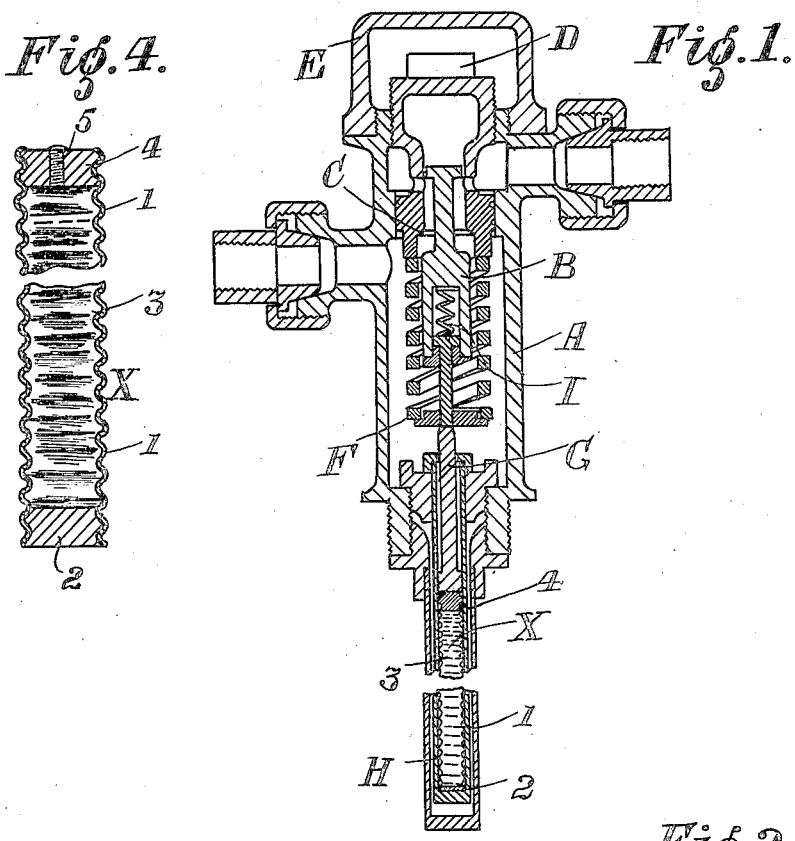
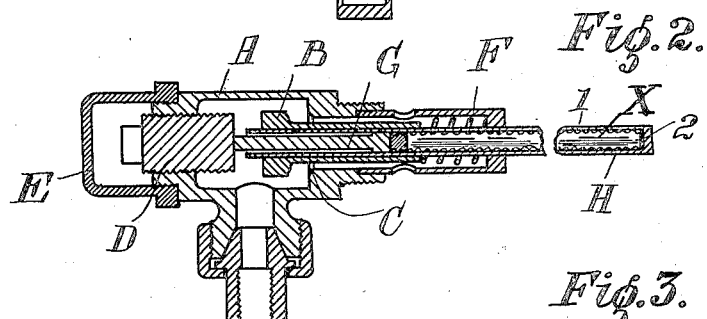
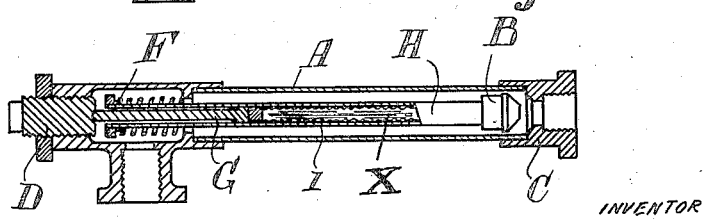

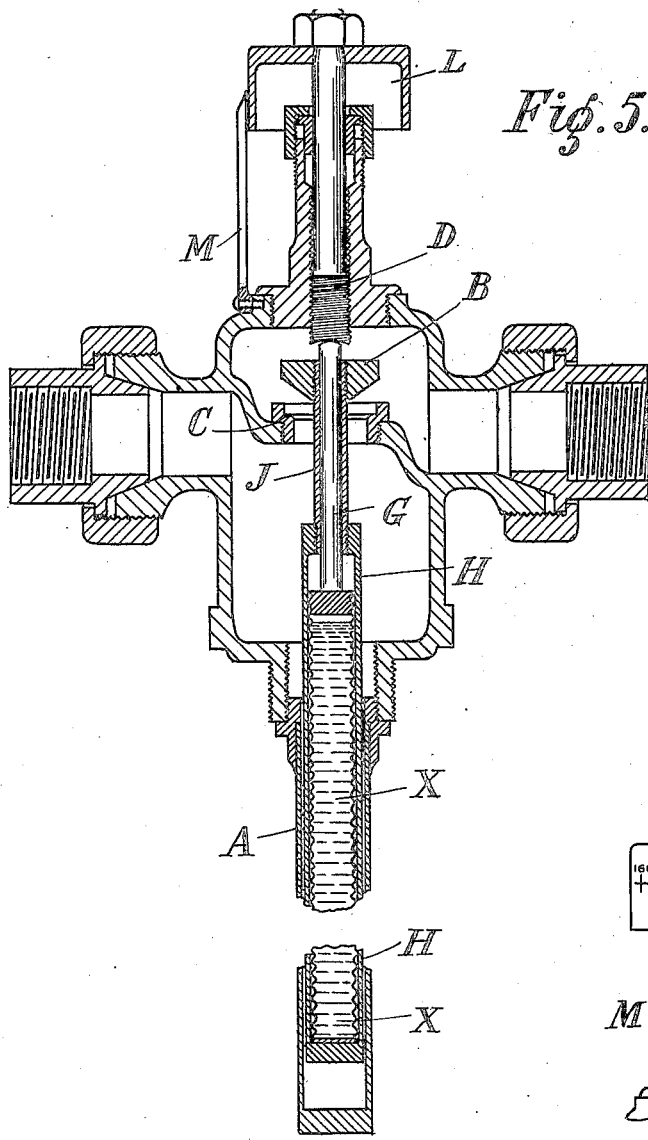

Patented Nov. 7, 1922.

1,434,542

UNITED STATES PATENT OFFICE.

ALEXANDER DEWAR HORNE, OF GLASGOW, SCOTLAND.

THERMOSTATIC CONTROL APPARATUS.

Application filed May 6, 1922. Serial No. 559,099.

*To all whom it may concern:*

Be it known that I, ALEXANDER DEWAR HORNE, a subject of the King of Great Britain, residing at Glasgow, Scotland, have invented certain new and useful Improvements in and Relating to Thermostatic Control Apparatus, of which the following is a specification.

This invention relates to thermostatic control apparatus, such as are used in connection with calorifiers, radiators, expansion traps and the like, of the type embodying an expansible element enclosed within an outer tubular member or casing and consisting of a closed corrugated tube wholly or partially filled with expansible liquid.

In such apparatus as heretofore commonly employed, the liquid filled corrugated expansible element is loosely mounted in the outer tubular member or casing and is adapted, on the attainment of a predetermined temperature, to close a valve, but, the arrangement is found, in practice, to be unsuitable when working at high pressures because the expansible element tends to buckle, particularly if the temperature at which the valve closes is exceeded to any appreciable extent, thereby detracting from the accuracy of the apparatus.

One object of the present invention is to overcome this tendency for the element to buckle when working at high pressures and, to the attainment of this end, I provide an improved thermostatic control apparatus, of the type specified, wherein the liquid filled corrugated expansible element and the surrounding tubular member or casing are in close (that is metallic) contact with one another so as to prevent lateral displacement of the element whilst admitting free axial expansion and contraction thereof. Another object is to provide a self contained expansible element with a suitable liquid therein and a third object is to provide an improved thermostatic control apparatus with the expansible element as part thereof.

I find from experiments that olive oil and castor oil, are specially suitable for use as liquids for filling the expansible elements. Olive oil is effective over a wide range of temperatures and is best employed as the expansible medium in connection with thermostats wherein the valve is to be closed at some temperature between, say, 50° F. and 100° F. Castor oil, on the other hand, is best suited to high temperatures, say above 100° F. It is advisable to boil the castor oil before filling same into the element in order to drive off any light volatile oils which may be present.

In the case of an element intended to operate at temperatures not exceeding 100° F., the liquid, preferably olive oil, may completely fill the element at atmospheric temperature but with an element intended for temperatures above 100° F., it is better that the liquid, preferably boiled castor oil, should only partially fill the same at atmospheric temperature thus providing for a certain amount of idle expansion of the liquid independently of the effective expansion of the element which first occurs when the temperature to which the element is subjected approximates (10° F.–20° F. lower than) that at which the valve is to close. This is easily ensured by first filling the tubular element, then heating it to a temperature of 10–20° F. below the minimum working temperature for which it is to be used so as to expel surplus liquid, and, finally, hermetically sealing the element whilst in the hot state. By "working temperature" is meant the temperature at which the thermostatic valve of the apparatus is to close.

The invention is illustrated, by way of example, on the accompanying drawing whereon:—

Fig. 1 is a view of an ordinary thermostatically controlled valve showing the improved thermostatic element in position.

Fig. 2 is a similar view of a radiator control valve with the improved thermostatic element in position.

Fig. 3 is a similar view of a steam trap with the thermostatic element in position.

Fig. 4 is a sectional elevation of one form or construction of the thermostatic element.

Fig. 5 shows, in vertical section, a modified construction of thermostatic valve. Fig. 6 is an elevation of the indicator, Fig. 5.

In Figs. 1, 2 and 3, A denotes the casing of the apparatus, B the valve, C the valve seat, D the adjusting screw, E the cap therefor, F the spring which opens the valve, and G a loose piston or plunger through which the expansion of the element X (hereinafter referred to) is communicated to the valve.

The expansible element X, as best seen in Fig. 4, consists of a spirally corrugated tube 1 closed, at one end, by a plate or equivalent 2 to form a container for a liquid 3, and also closed, at its other end, by a cap 4. The cap 4 is screw threaded to correspond to the corrugations of the tube and is welded, sweated, or soldered in place in the tube 1. A hole or passage 5 is made through the plug to allow excess liquid to escape when the plug is inserted or when the element is heated, in the manner previously stated, before being finally hermetically sealed by closing said passage.

The expansible element is contained in a protective tube or casing H in such manner that its inner annular wall is in close contact with the element and serves to guide and support it against bulging or buckling during expansion and contraction.

In the thermostatic valve shown in Fig. 1 the tube H is rigidly attached to the casing A. As the element 1 expands in the tube H it moves the plunger G and valve B against the action of the spring F until, when a certain predetermined temperature (which is capable of regulation by means of the adjusting screw D) is reached the valve closes on its seat C. Any further expansion of the element is taken up by the weak spring I. When the temperature drops and the element contracts again the valve is reopened by the spring F.

In the radiator control valve and steam trap shown in Figs. 2 and 3 respectively the tube H is slidably mounted in the casing A and the valve B is movable therewith. Under expansion of the element the tube moves to the right in the figures and in so doing moves the valve towards its seat C. The valve closes when a certain temperature is reached as determined by the position of the adjusting screw D.

In the arrangement shown at Fig. 5 the expansion of the element X causes the tube H to move downwards and gradually close the valve B which is connected to the tube by the hollow stem J. The temperature at which the valve automatically closes is regulated by a screw D having an indicator hand wheel L. The screw engages the upper end of the plunger rod G bearing against the top of the element X. The pointer M indicates the extent to which the hand wheel requires to be turned for the different temperatures.

Having now fully described my invention what I claim and desire to secure by Letters Patent is:—

A thermostat, including a valve casing having a valve seat therein, a protective tube mounted in the casing, a thermostatic element mounted in said tube and directly contacting therewith, said tube thereby confining said element and causing the same to move in alignment and in contact with the casing to guide the element in the operation of the latter and prevent buckling, a plunger slidably mounted in one end of the tube and projecting beyond the end thereof, a valve slidably mounted on the end of the plunger, and resilient means between the end of the plunger and the valve for holding the valve in projected position on the plunger, whereby in the expansion and contraction of the thermostatic element, the valve will be moved toward or away from the seat in the casing, and the resilient means will take up a further movement of the plunger after the valve is seated.

In testimony whereof I affix my signature in presence of two witnesses.

ALEXANDER DEWAR HORNE.

Witnesses:
 KATE WALKER,
 MARY GREEN.